Nov. 22, 1927.
J. P. LEWIS
RODENT TRAP
Filed Oct. 25, 1926
1,650,455
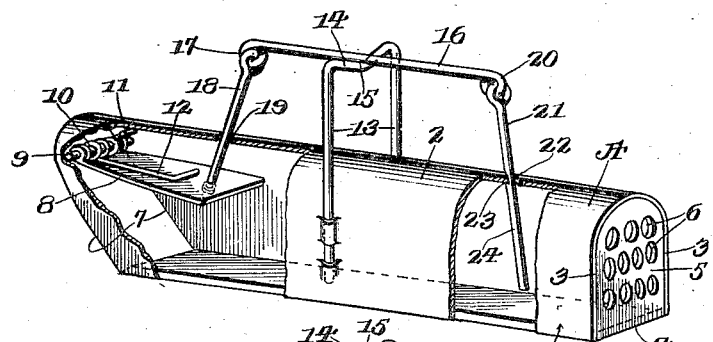
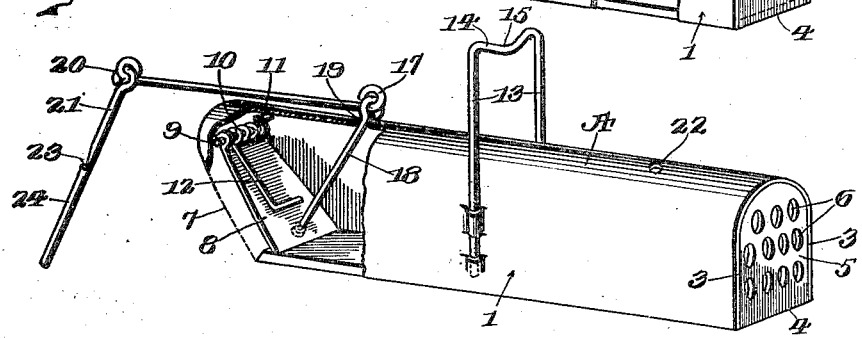
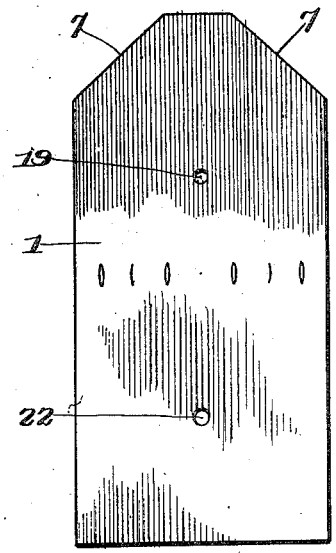
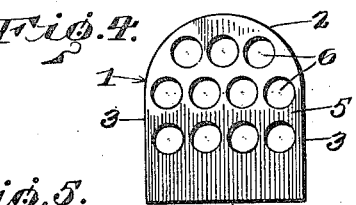
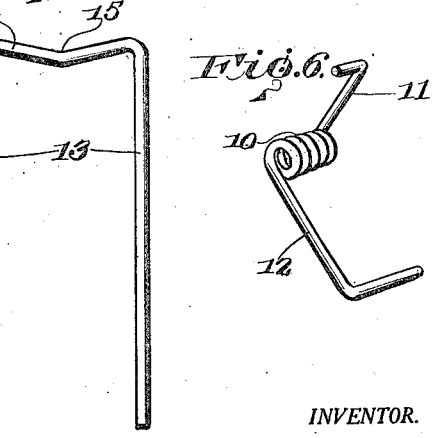
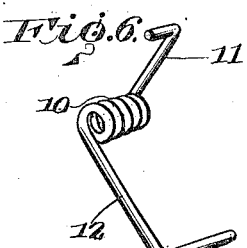
INVENTOR.
John P. Lewis,
BY
Geo. P. Kimmel
ATTORNEY.

Patented Nov. 22, 1927.

1,650,455

UNITED STATES PATENT OFFICE.

JOHN P. LEWIS, OF TILLAMOOK, OREGON.

RODENT TRAP.

Application filed October 25, 1926. Serial No. 144,131.

The invention relates to a trap and more especially to the class of rodent traps, for catching gophers, moles or other burrowing rodents.

The primary object of the invention is the provision of a trap of this character, wherein the construction thereof is such to entice animals, particularly the burrowing rodents, to enter the said trap and when within the same will become imprisoned or trapped, so that such animal will be held, without injury to the same or any liability of the escape of the animal.

Another object of the invention is the provision of a trap of this character, wherein the closure therefor is set in open position and automatically released for closing movement, when a gopher, mole, or other rodent enters the trap with a view of seeking or acquiring the food or bait therein and the closure when swung to closed position will entrap the animal, without possibility of body injury or the liability of the escape of such animal from the trap.

A further object of the invention is the provision of a trap of this character, wherein the construction thereof is novel in form, so that the same can be set for the trapping of rodents, and is automatic in action for the positive retention of the animal when entering the trap, without possibility of the injury to the animal or the killing of the same.

A still further object of the invention is the provision of a trap of this character, which is extremely simple in construction, thoroughly reliable and efficient in its purpose, readily and easily portable, being light in weight, yet strong and durable, and inexpensive to manufacture.

With these and other objects in view, the invention consists in the features of construction, combination and arrangement of parts, as will be hereinafter more fully described, in detail, illustrated in the accompanying drawing showing the preferred embodiment of the invention, and pointed out in the claims hereunto appended.

In the accompanying drawing:

Figure 1 is a perspective view of the trap constructed in accordance with the invention, showing a portion of its body broken away and with the closure in open position and latched for the trapping of an animal within the trap.

Figure 2 is a similar view to Figure 1 showing the closure released and in closed position.

Figure 3 is a detailed plan view of the blank from which the body of the trap is made.

Figure 4 is a detailed elevation of the end wall of the trap.

Figure 5 is an elevation of the fulcrum bracket for the latching device controlling the closure of the trap.

Figure 6 is a perspective view of the tensioning spring for the closure of the trap.

Similar reference characters indicate corresponding parts throughout the several views in the drawing.

Referring to the drawing in detail, A designates generally the body of the trap, made from a single piece or blank of material 1, preferably sheet metal cut into the desired form to provide a rounded crown or top 2, opposed sides 3 and a bottom 4, respectively, the piece of material or blank 1 being bent or folded on itself with its meeting longer side edges joined in any suitable manner. The body A of the trap is of elongated formation and closed at one end by an end wall 5 having a series of ventilating holes 6 therein. This end wall 5 is made fast to the body A in any suitable manner. The opposite open end of the body A is cut to provide an inwardly inclined or beveled entrance mouth 7 for free access therethrough to the interior of the trap as will be obvious.

Arranged contiguous to the mouth 7 and swingingly supported for opening and closing movement is a closure door, gate or the like 8, the same being hung from its top portion for swinging movement upon a transverse pivot 9 suitably mounted in the sides 3 of the body A close to the crown 2 thereof. This closure door, gate or the like 8 can be connected to the pivot 9 in any desirable manner and the latter has carried thereon a coiled tensioning spring 10 having the arm 11 playing against the inner face of the crown 2 and its other arm 12 playing against the inner face of the door, gate or the like 8 and in this manner the latter under the tension of said spring 10 is urged to closed position for closing the entrance 7 to the trap.

Suitably connected with the body A of the trap and adapted to rise above the same for the required distance is an inverted substantially U-shaped fulcrum member 13, the same being preferably made from a single length of wire bent into the required form, with its top cross bar 14 slightly sunken at 15 medially thereof, to provide a seat for a rocker bar 16, one end of the latter being linked at 17 with a connecting member 18 engaged with the closure, that is the door, gate or the like 8, the engagement being a loose coupling with the latter. This member 18 works through a suitable hole 19 formed in the crown 2 of the body A of the trap. The other end of the bar 16 has linked at 20 therewith a latching pin 21, the same working through a suitable hole 22 formed in the crown 2 of the body A of the trap. This pin 21 has cut therein a latching lip 23, which is adapted for engagement with the edge of the opening 22 to lock the pin 21 in latched relation to the body A of the trap. The pin 21 when latched to the body A has its free end protruded within the body A of the trap and this free end 24 constitutes a bait hanger, as any character of bait can be hung upon the pin 24 for the purposes of enticing animals within the body A of the trap.

In the use and operation of the trap the closure 8 by pulling upon the connecting member 18 can be moved to open position against the resistance of the spring 10 and to sustain such closure 8 in opened position, the rocker bar 16 is fulcrumed across the fulcrum member 13 while the pin 21 is passed through the opening 22 so that the lip 23 will latch the pin to the body A of the trap as is clearly shown in Figure 1 of the drawing. Thereafter the bait is hung upon the pin 21 and its free end 24 projected interiorly of the body A of the trap. The trap is now set and when an animal enters through the mouth 7 and nibbles or attempts to release the bait from the pin 21, the latter will become automatically unlatched, thus freeing the closure 8 which under the action of the spring 10 will rapidly swing to closing position as shown in Figure 2 of the drawing entrapping the animal within the body A of said trap or the imprisonment of such animal. During the closing movement of the closure 8, the pin will become extracted through the hole or opening 22 in the crown 2 of the body A and the said pin and the fulcrum bar 16 will fly free and off of the fulcrum member 13 rising from the body A of the trap.

From the foregoing it is thought that the construction and manner of operation of the trap will be clearly understood and therefore a more extended explanation has been omitted.

What is claimed is:

1. A trap of the character described comprising a body closed at one end and open at its opposite end, a closure member swingingly mounted in the body at the open end thereof, means for tensioning the closure member, a fulcrum element connected with and rising from the body exteriorly thereof, a rocker bar fulcrumed on said fulcrum element, a connection between the closure member and one end of the rocker bar, and a pin connected with the other end of the rocker bar and adapted to be protruded through the body and latched therewith to normally hold the closure member in open position against the resistance of the tension means.

2. A trap of the character described comprising a body closed at one end and open at its opposite end, a closure member swingingly mounted in the body at the open end thereof, means for tensioning the closure member, a fulcrum element connected with and rising from the body exteriorly thereof, a rocker bar fulcrumed on said fulcrum element, a connection between the closure member and one end of the rocker bar, and a pin connected with the other end of the rocker bar and adapted to be protruded through the body and latched therewith to normally hold the closure member in open position against the resistance of the tension means, said body being provided with openings through which work the latching pin and the connection between the closure member and the rocker bar.

3. A trap of the character described comprising a body closed at one end and open at its opposite end, a closure member swingingly mounted in the body at the open end thereof, means for tensioning the closure member, a fulcrum element connected with and rising from the body exteriorly thereof, a rocker bar fulcrumed on said fulcrum element, a connection between the closure member and one end of the rocker bar, a pin connected with the other end of the rocker bar and adapted to be protruded through the body and latched therewith to normally hold the closure member in open position against the resistance of the tension means, said body being provided with openings through which work the latching pin and the connection between the closure member and the rocker bar, and a sunken portion formed at the top of the fulcrum element to provide a seat for the said bar.

JOHN P. LEWIS.